June 16, 1964

C. J. BARTON ETAL

3,137,543

METHOD FOR DETERMINING THE PHOSPHATE CONTENT
OF PHOSPHATIC MATERIALS

Filed June 24, 1960

C. J. BARTON ETAL
METHOD FOR DETERMINING THE PHOSPHATE CONTENT
OF PHOSPHATIC MATERIALS 3,137,543

Filed June 24, 1960

United States Patent Office 3,137,543
Patented June 16, 1964

3,137,543
METHOD FOR DETERMINING THE PHOSPHATE CONTENT OF PHOSPHATIC MATERIALS
Charles J. Barton, Oak Ridge, Tenn., and James E. Lawver, Lakeland, Fla., assignors to International Minerals & Chemical Corporation, a corporation of New York
Filed June 24, 1960, Ser. No. 38,667
17 Claims. (Cl. 23—230)

The present invention generally relates to a method for determining the phosphorus content of phosphatic materials. More particularly, the invention relates to a method and apparatus for continuously or semi-continuously colorimetrically determining the acid reactable phosphorus content of phosphatic materials, such as phosphate rock.

It is frequently desirable or necessary to determine the phosphorus content of various phosphatic materials. In the mining of phosphate rock, it is necessary to know the $P_2O_5$ content in order to determine whether or not the mining of the particular rock deposit is economical. In the fertilizer industry, the phosphorus content is important and is expressed as "bone phosphate of lime," commonly abbreviated as BPL. The BPL content is the equivalent of $Ca_3(PO_4)_2$. In the analysis of phosphatic materials, however, the chemist generally reports the phosphorus content in terms of phosphorus pentoxide ($P_2O_5$). Each of these forms of reporting an analysis, that is as elemental phosphorus, $P_2O_5$, or BPL, is readily convertible to the equivalent amount of the other forms.

Various laboratory methods have been developed for determining the phosphorus content of phosphatic materials. These laboratory methods, while usually quite accurate, require a comparatively long period of time to perform. For some purposes, the long period of time required for the usual laboratory method of analysis of the phosphatic material is disadvantageous. For example, in a production plant which is processing phosphate rock to produce a product of higher BPL concentration or to produce various other phosphatic materials such as superphosphate or triple superphosphate fertilizers, phosphoric acid, etc., it is frequently desirable or necessary to know the phosphate concentration of the various moving streams in the plant so that adjustments in the operation can be made so as to effect the most efficient and economical operation. A sample of the particular process stream could be taken and analyzed in the laboratory in the usual manner; however, as before mentioned, this takes a considerable amount of time. It is far more desirable to have the phosphate content of a particular process stream measured in a relatively short period of time so that process variables in the plant may be adjusted and the result of any adjustment soon made known to the plant operator. It is also desirable to have the process variables controlled automatically so as to obtain a relatively uniform product without manual adjustment of the means which affect the product. For example, in a plant making triple superphosphate fertilizer by treating phosphate rock with phosphoric acid, it is desirable for the operator to know the phosphate concentration of the phosphate rock being fed to the mixing chamber so that the rate of phosphoric acid addition can be controlled to produce a product of uniform $P_2O_5$ content. If the strength of the phosphoric acid also varies, it is also desirable to know the concentration of the acid being mixed with the phosphate rock so that the ratio of the acid to the rock can be adjusted to produce a uniform product. It is obviously necessary that these phosphate concentrations be determined in a comparatively short period of time in order that changes in the process variables may rapidly be made, if necessary, and for this purpose the laboratory methods of analysis are not usually rapid enough.

Some continuous analyzers have been developed by the prior art for continuously or semi-continuously analyzing various materials. However, the prior art has not provided a continuous or semi-continuous process which may be used effectively to determine the phosphorus content of phosphatic materials, especially solid phosphatic materials which contain relatively acid insoluble constituents. The acid insoluble constituents are particularly troublesome since they tend to clog previously known analyzers or otherwise interfere with their efficient operation.

It is, accordingly, an object of the present invention to provide a method for determining the phosphorus content of phosphatic material which overcomes disadvantages and limitations of methods heretofore known.

Another object of the present invention is to provide a method for continuously or semi-continuously determining the acid reactable phosphorus content of phosphatic material.

A further object is to provide a method for continuously or semi-continuously and rapidly determining the acid reactable phosphorus content of phosphatic material, which method utilizes colorimetric means.

An additional object of the present invention is to provide a method for continuously or semi-continuously and rapidly determining the acid reactable phosphorus content of phosphatic material containing an acid reactable phosphorus compound and a relatively acid insoluble constituent, which method is readily adaptable to automatically controlling process variables in a phosphate processing plant.

Further objects and advantages of the present invention will be apparent from the following description and accompanying drawings which illustrate several embodiments of the invention. In the drawings.

The present invention provides a method for rapidly determining the phosphorus content of phosphatic material which may be reported as elemental phosphorus, $P_2O_5$, phosphate, BPL, or otherwise. The method may readily be understood from the following description and by referring to the drawings. Briefly, the method of the present invention comprises the steps of introducing a predetermined weight of solid phosphatic material in finely divided form into a reaction zone, continuously passing into the reaction zone at a substantially constant predetermined rate an acid having a substantially constant predetermined concentration and capable of converting substantially all of the acid reactable phosphorus values in the phosphatic material into phosphoric acid, Agitating conditions are maintained in the reaction zone. Solution and any entrained solid material are continously overflowed from the reaction zone and are introduced into a splitting or separation zone from which a substantially solids free solution of phosphoric acid is withdrawn. At least a portion of the withdrawn phosphoric acid-containing solution is introduced at a substantially constant predetermined rate into a mixing zone and a reagent which reacts with the phosphoric acid to produce a colored solution is also introduced into the mixing zone at a substantially constant predetermined rate. The intensity of the color of the solution is then measured. The intensity of the color is related to the concentration of the phosphoric acid and, therefore, by measuring the intensity of the color, the concentration of the phosphoric acid may be determined. The term "phosphoric acid" is used herein and in the claims and it is to be understood that one or more of the various forms of phosphoric acid are included in this term.

In accordance with the method of the present invention, a predetermined weight of a material containing an acid reactable phosphorus compound is reacted with a predetermined quantity of an acid. The phosphatic material may be a liquid, for example phosphoric acid; however, the method is particularly suitable for analyzing solid phosphatic material, such as phosphatic ore, and the apparatus shown in the drawings is specifically designed to handle solid phosphatic material containing relatively acid insoluble constituents, such as silica. The method is particularly suitable for analyzing compositions containing tricalcium phosphate, dicalcium phosphate, monocalcium phosphate, and mixtures of two or more of these materials, which compositions in their commercially available form frequently contain materials which are not substantially acid soluble, that is, materials which are not soluble in the acid under the conditions the phosphorus compounds are contacted with the acid. The method, however, is also effective in the absence of materials which are not acid soluble or reactable.

The predetermined weight of the phosphatic material may be delivered by any of the known types of devices which deliver a predetermined weight of a solid material at a substantially constant rate or at predetermined time intervals. The material fed to the weighing device is preferably in a finely divided form so that an accurate weight of the phosphatic material may be delivered by the device. Therefore, when the phosphatic material is in large lumps or granules, these are preferably comminuted before introducing the phosphatic material to the feeding or weighing device. A relatively small size particle feed is also preferred in the method of the present invention to facilitate substantially complete reaction between the acid and the acid reactable phosphorus compounds in the phosphatic material.

In the embodiment of the present invention illustrated in FIGURES 1 to 6, the predetermined weight of the phosphatic material is reacted with a predetermined amount of acid in a reaction zone designated by the numeral 11. The reaction zone 11 illustrated comprises two reaction vessels with the second vessel also operating as a separation zone in which the phosphoric acid flow is separated or divided with one portion of the phosphoric acid solution withdrawn from the separation zone being substantially solids-free and the other portion of the phosphoric acid solution withdrawn from the separation zone containing any solids remaining in the separation zone. In the embodiment of the invention illustrated in FIGURE 7, the phosphatic material is reacted with a predetermined amount of acid in a reaction zone designated by the numeral 12. The acid used is one which reacts with substantially all of the acid reactable phosphorus values in the phosphatic material to convert the acid-reactable phosphorus values into phosphoric acid. Phosphates are readily reactable with most acids to produce phosphoric acid and any suitable acid which reacts with the phosphates in the phosphatic material to produce phosphoric acid may be used. Organic acids may be used; however, it is preferred to use inorganic acids and preferably strong mineral acids, such as hydrochloric acid, sulfuric acid and nitric acid to insure substantially complete reaction of the acid reactable phosphorus compounds with the acid. Hydrochloric acid is a specifically preferred acid since it produces excellent results with a minimum of side reactions. It is necessary to react a predetermined amount of acid with the phosphatic material, and a preferred manner of doing this is to use an acid of a substantially constant predetermined concentration and to react the phosphatic material with a predetermined volume of this acid. In accordance with the embodiment of this invention illustrated in FIGURE 6, the acid is continuously passed from a source of acid, such as acid head tank 13, into the reaction zone 11 at a substantially constant predetermined rate. In the embodiment illustrated in FIGURE 7, the acid is continuously passed from acid head tank 13' into the reaction zone 12 at a substantially constant predetermined rate. In this manner, the phosphatic material is contacted with a predetermined amount of the acid. Most phosphates, and specifically calcium phosphates, are reactive with strong mineral acids at ordinary room temperature and, therefore, elevated temperatures usually are not needed; however, elevated temperatures may be used if desired or if necessary. The acid used is preferably concentrated so that substantially complete reaction with the acid reactable phosphorus compounds in the phosphatic material occurs. Dilute acid, however, may be used if desired.

The resultant phosphoric acid-containing solution is withdrawn from the reaction zone and at least a solids-free portion thereof is mixed with a reagent which reacts with the phosphoric acid to produce a colored solution. In accordance with a preferred embodiment of the present invention, the phosphoric acid-containing solution is continuously withdrawn from the reaction zone at a substantially constant predetermined rate.

As hereinbefore set forth, in order to have substantially complete reaction between the phosphates and the acid, the acid is preferably in concentrated form. It is, however, preferable to have the phosphoric acid in a substantially dilute form before mixing with the reagent to form the colored solution. Therefore, it is preferable to dilute the phosphoric acid-containing solution. This is done by diluting the solution with a predetermined amount of water to achieve the desired dilution. The dilution may be accomplished substantially simultaneously with the removal of any solids that may be in the phosphoric acid solution. In accordance with the preferred embodiment of the present invention illustrated in FIGURES 1 to 6, at least a portion of the substantially solids-free phosphoric acid soluiton withdrawn from the second reaction vessel or separation zone 29 is introduced at a substantially constant predetermined rate into a dilution zone 15 and simultaneously water from a supply such as water head tank 17 is introduced into the dilution zone 15 at a substantially constant predetermined rate. A dilute solution of the phosphoric acid is then withdrawn from the dilution zone and is preferably withdrawn at a substantially constant predetermined rate. In the preferred embodiment illustrated in FIGURE 7, the phosphoric acid solution withdrawn from reaction zone 12 is passed into a dialysis cell 14. The dialysis cell 14 is divided into two separate compartments 16 and 18 by a semi-permeable membrane 20 through which ions of phosphoric acid and/or phosphoric acid molecules may pass from compartment 16 to compartment 18 by dialysis. The phosphoric acid solution withdrawn from reaction zone 12 passes through compartment 16 and while passing through compartment 16, some of the phosphoric acid molecules and/or phosphate ions resulting from the ionization of the phosphoric acid pass through membrane 20 into compartment 18. Any solids in the phosphoric acid in compartment 16 do not, however, pass through the semi-permeable membrane. Water is continuously passing through compartment 18 at a substantially constant predetermined rate. In this manner the phosphoric acid solution withdrawn for compartment 18 is substantially solids-free and is more dilute than that introduced into compartment 16. The dialysis cell 14, therefore, effectively dilutes the phosphoric acid. The rate at which phosphoric acid molecules and/or phosphate ions from the phosphoric acid pass through the semi-permeable membrane depends, of course, upon the concentration differential across the membrane. Therefore the concentration of the phosphoric acid withdrawn from compartment 18 depends directly upon the concentration of the phosphoric acid introduced into compartment 16. The theory and operation of dialysis cells is well known and discussions of theory and operation may be found in many articles and books, for example, books on physical chemistry. Since the membrane 20 is only semi-permeable, any solids in the solution in compartment 16 will not pass through into compartment 18. In this manner an efficient removal of solids is also effected by the dialysis cell. The dialysis cell 14, like the second reaction vessel 29 illustrated in FIGURE 6, therefore, also operates as a separation zone which effectively divides or splits the phosphoric acid values; one phosphoric acid stream withdrawn from the separation zone being substantially solids-free, and the other phosphoric acid stream containing substantially all of the solids which may be in the separation zone.

At least a portion of the dilute substantially solids-free phosphoric acid-containing solution withdrawn from the dilution zone 15 (FIG. 6) or the dialysis cell 14 (FIG. 7) is passed at a preferably substantially constant predetermined rate into a reagent mixing zone wherein the solution is contacted with a reagent which reacts with the phosphoric acid to produce a colored solution. The intensity of the color is then measured and, from a predetermined correlation between intensity of color vs. concentration of phosphoric acid, the concentration of the acid is determined, which is, of course, a measure of the amount of acid reactable phosphorus, or $P_2O_5$, or BPL in the original phosphatic material. In the embodiment illustrated in FIGURES 1 to 6, the reagent is introduced from a source of supply such as reagent head tank 21 to the reagent mixing zone 19 at a substantially constant predetermined rate. In the embodiment illustrated in FIGURE 7, the reagent passes from reagent head tank 21' into a mixer 22 at a substantially constant predetermined rate.

A colorimetric method is used to determine the concentration of the phosphoric acid solution and, therefore, a reagent is used which reacts with the phosphoric acid to produce a colored solution. Colorimetric methods of analysis consist of treating a solution of a substance with a reagent in such a way as to produce a color which is proportional in intensity to the amount or concentration of substance present in the solution. The color having been produced, the color of the solution containing an unknown concentration of the substance is compared with the color of a standard solution.

The reagent to be used may be any suitable one which will react with the phosphoric acid to produce a colored solution. The concentration of the phosphoric acid may be colorimetrically determined by converting the phosphoric acid to a phosphomolybdate, a phosphovanadiomolybdate, etc., by the use of suitable reagents which are well known in the art. A reagent for reacting with the phosphoric acid may be prepared by mixing 5 ml. of 1:5 nitric acid and 4 ml. of 5% neutral ammonium molybdate solution and diluting to 50 ml. A reagent for adding to the phosphoric acid to determine the concentration of phosphorus as the phosphovanadiomolybdate may be prepared by dissolving 2.4 grams of ammonium vanadate in 200 ml. of water, adding 20 ml. of 1:1 nitric acid, diluting to 1 liter, and then adding one liter of a 10% ammonium molybdate solution. The phosphovanadiomolybdate is a yellow solution and the concentration of phosphorus is preferably determined in this form since good results have been obtained in this manner.

At least a portion of the colored solution is withdrawn from the reagent mixing zone, preferably at a substantially constant predetermined rate and is passed to a colorimeter wherein the intensity of the color is measured. In a preferred embodiment of the invention the colored solution is passed through a colorimeter at a substantially constant predetermined rate and the color intensity of the flowing stream is continuously measured.

A preferred method of colorimetric determination is to pass the colored solution through an absorption cell which utilizes a substantially constant intensity light source. The amount of light passing through the absorption cell depends upon the intensity of the color of the solution. Therefore, by measuring the amount of light passing through the solution by means of a photoelectric cell, the intensity of the color and, likewise, the concentration of the phosphoric acid are determined.

The colorimeter may be provided with continuous recording devices which continuously indicate the amount of light transmitted, or the recording devices may be proportioned to directly indicate the concentration of the phosphoric acid or the acid reactable phosphorus, or $P_2O_5$, or BPL content of the original phosphatic material which was converted into phosphoric acid.

The method of determining the concentration of the acid reactable phosphorus compound or compounds in a solid will be more fully understood from the following description of the embodiments of the method of the present invention which are illustrated in the drawings. The methods are described in conjunction with a specific operating example of the determination of the BPL concentration of a solid.

Referring now to FIGURES 1 to 6 of the drawings, the embodiment of the invention illustrated in these figures generally includes reaction vessels 27 and 29 which in part provide the reaction zone 11, the acid head tank 13, the water head tank 17, the dilution tank 15, the reagent head tank 21, the reagent mixing tank 19, and the colorimeter 23. The numbers used to designate various pieces of the apparatus illustrated in FIGURES 1 to 5 are also used to designate the corresponding apparatus schematically illustrated in FIGURE 6. Referring now more particularly to FIGURES 1 to 6 of the drawings, the specific analyzer illustrated embodies various of the features of the invention and, as has been pointed out, is particularly adapted for the analysis of the BPL content of phosphate rock. The illustrated analyzer includes a box-like structure or frame 31 of fabricated construction having various mounting boards, supports, and shelves, which are suitably connected together. Most of the pieces of the apparatus are clamped to a main flat vertical member 33 and the various supporting shelves extend from this member.

Figure 1:
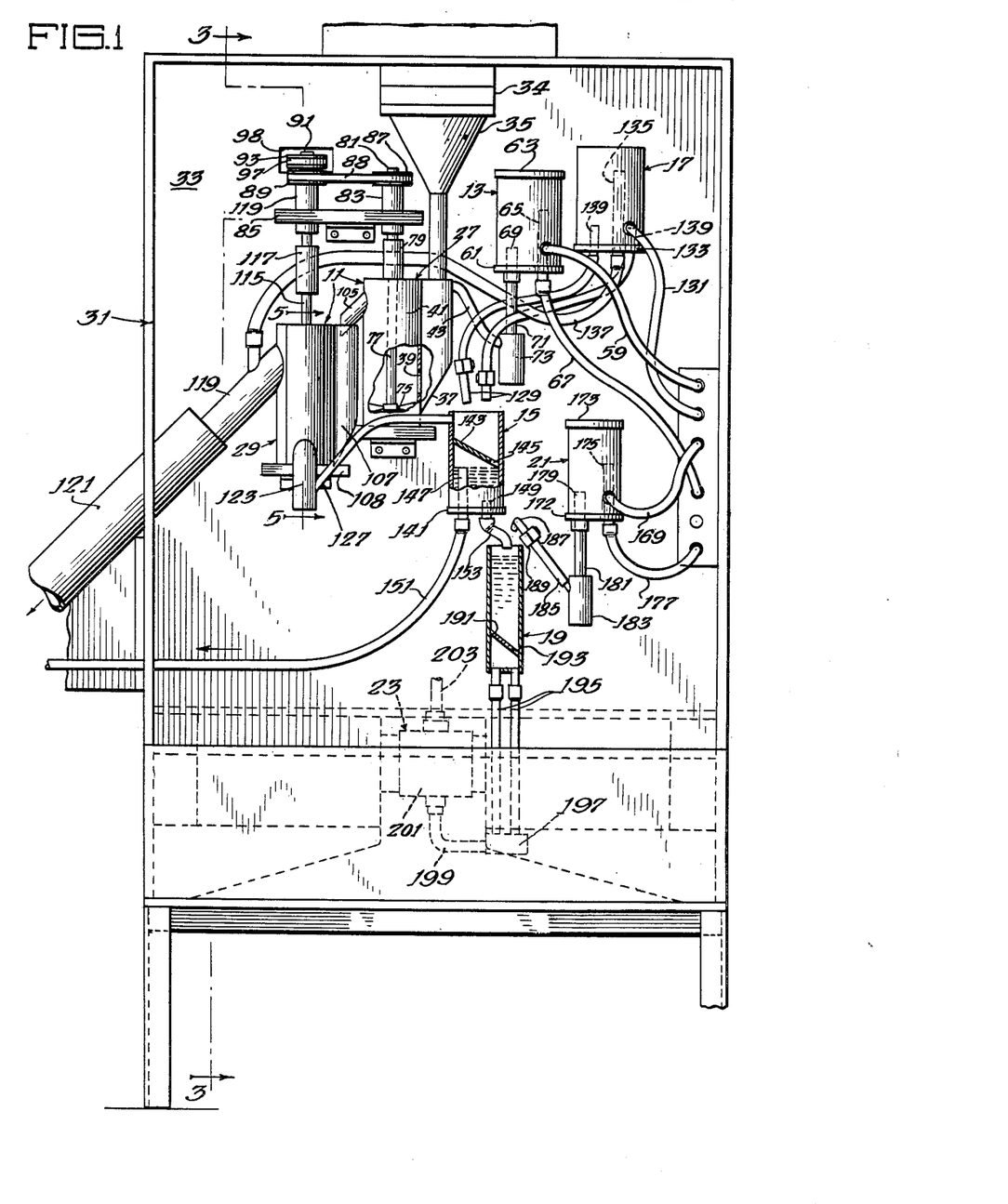
FIGURE 1 is a front elevational view, partially in section, of an apparatus which is used to effect the process of the present invention.
Figure 6:
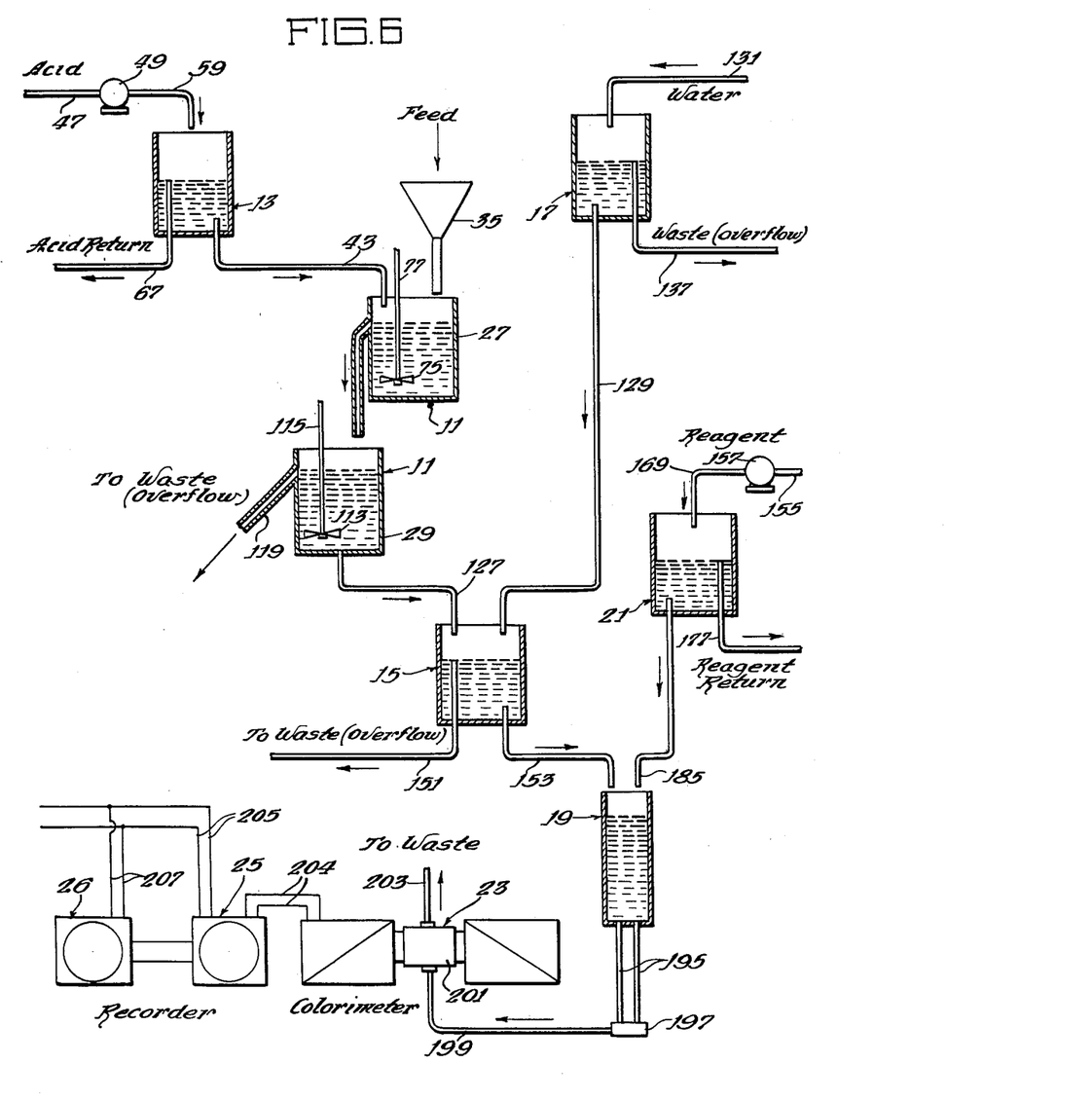
FIGURE 6 is a schematic representation of the apparatus shown in FIGURES 1 to 5 illustrating its operation in a method for determining the acid reactable phosphorus content of phosphate rock.

A predetermined amount of the phosphatic material to be analyzed is delivered from a weighing device (not illustrated) either in a constant stream or at periodic intervals through a box-like conduit 34 into a funnel 35 which collects the material and directs it downwardly into a primary reaction vessel or cell 27 which is positioned directly below the funnel. The material is delivered to a standpipe 37 on the reaction cell 27. The standpipe 37 has an opening 39 in the lower portion thereof and the material introduced into the standpipe flows through the opening into the main reaction chamber 41 of the reaction cell 27. In one commercial embodiment of this invention 5.0 to 10.0 grams of a predominantly silica material containing some phosphate were dropped into the funnel 35 every 4 minutes.

In the main reaction chamber 41 the material reacts with an acid that is introduced into the reaction chamber through conduit 43. The acid is introduced into the reaction chamber 41 at a constant predetermined flow rate by a constant acid feed means. In the commercial embodiment of this invention, 18% by weight hydrochloric acid was introduced into the main reaction chamber 41 at the rate of 45 ml. per minute.

The acid is supplied from a large source such as reagent bottle 45. The acid is withdrawn from the bottle 45 through conduit 47 and passes into the suction end of a micropump 49. The micropump 49 is driven by an electric motor 51 which is connected through lead 53 (FIGURE 2) to a switch box 55 which is supplied with electrical energy from an electrical source (not shown) through lead 57. The acid is discharged from the micropump 49 through a conduit 59 which is connected to a lower portion of the acid head tank 13. The acid head tank 13 is of the constant-head type and is supported above the level of the reaction chamber 41 on a platform 61 which is secured to the main vertical supporting member 33. To prevent splashing of acid out of the acid tank 13 a cover 63 is provided.

An overflow standpipe 65 extends through the bottom of the acid head tank 13 and terminates in an upper portion of the tank. A return conduit 67 connects with the lower end of the standpipe 65 and conducts acid overflowing into the standpipe 65 back to the reagent bottle 45 for reuse. The acid head tank 13 also has a second standpipe 69 therein and the upper end of this standpipe 69 terminates below the upper end of standpipe 65. The amount of acid entering through conduit 59 is greater than that withdrawn through standpipe 69 and, therefore, the level of the acid in the tank 13 will be at the upper level of the overflow standpipe 65 and there will, therefore, be a constant head or pressure on the upper end of standpipe 69, and the flow therethrough will be substantially constant. The lower end of the standpipe 69 is connected to a conduit 71 which connects with a trap 73. Any solid heavy materials in the acid will settle to the bottom of the trap 73. The level of acid in the acid head tank 13 is higher than the level of the liquid in the reaction cell 27, and, therefore, acid flows by gravity through conduits 71 and 43 at a constant flow rate into the reaction cell 27. In the commercial embodiment of this invention, the micropump 49 delivered approximately 450 ml. per minute of 18% hydrochloric acid to the head tank 13 and 45 ml. per minute of the acid were withdrawn through conduit 71 and delivered to the reaction cell 27. Approximately 405 ml. per minute of acid were, therefore, returned to the acid bottle 45 through conduit 67.

Figure 2:
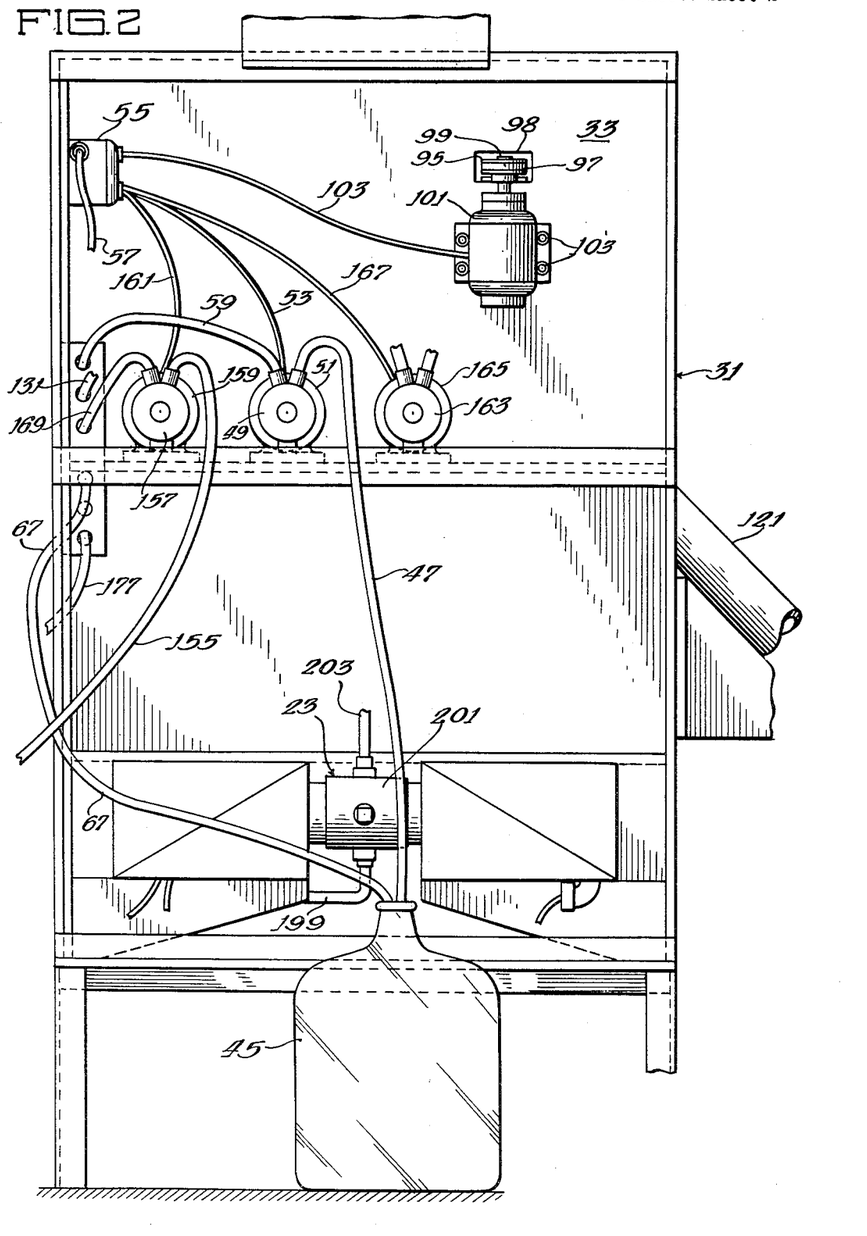
FIGURE 2 is a rear elevational view of the apparatus shown in FIGURE 1.
Figures 3, 4, 5:
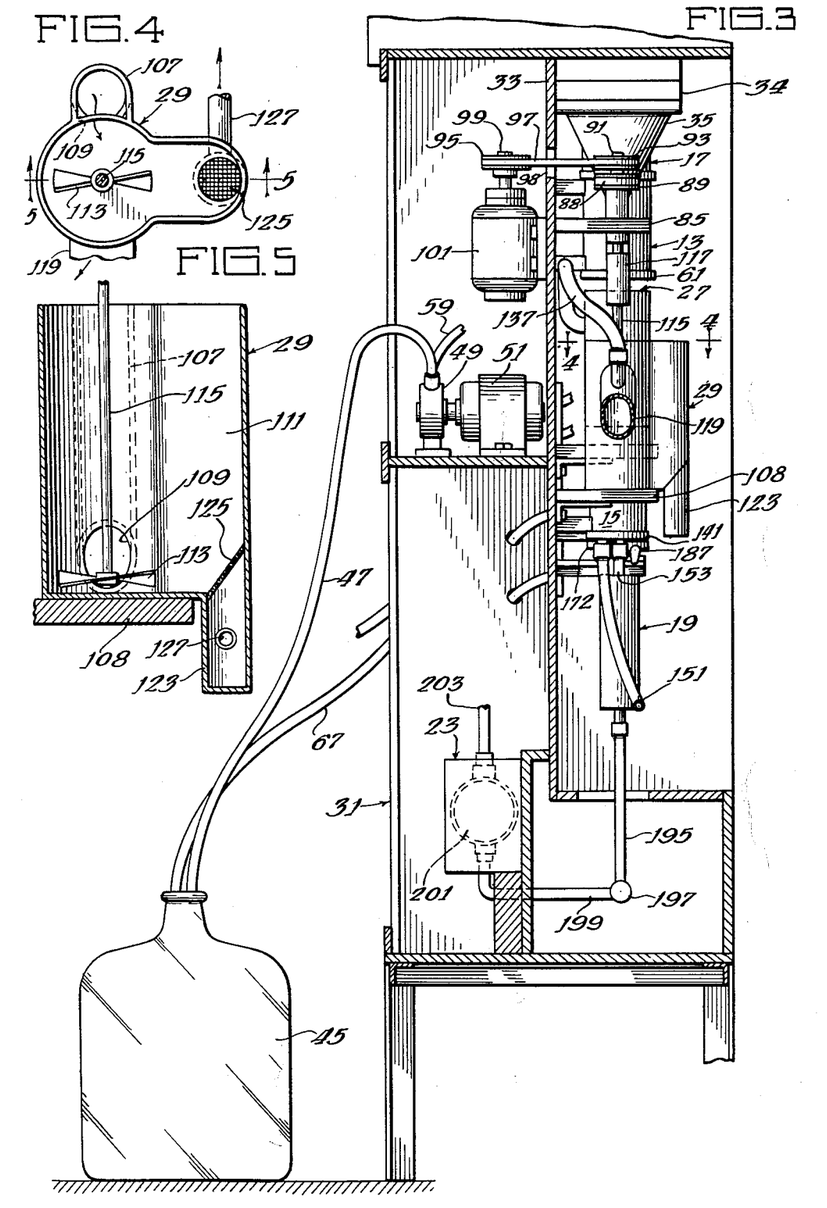
FIGURE 3 is a sectional view of the apparatus shown in FIGURES 1 and 2 taken along line 3—3 of FIGURE 1.
FIGURE 4 is an enlarged partial sectional view taken along line 4—4 of FIGURE 3.
FIGURE 5 is an enlarged sectional view of one of the solution cells of the apparatus taken along line 5—5 of FIGURE 1.

The acid and solid material react in the main reaction chamber 41. In order to speed the reaction and to maintain the solids in suspension in the liquid, an agitation means is provided in the main reaction chamber 41. The agitation means comprises an impeller 75 which is secured to a lower end of a shaft 77. The upper end of the shaft is connected to a coupling 79. A shaft 81 extends upwardly from the upper end of the coupling 79 and passes through an alignment bearing 83. The alignment bearing 83 is secured in a support 85 which is secured to and extends outwardly from the main vertical member 33. The upper end of shaft 81 is connected to a driven pulley 87 which is drivingly connected through pulley belt 88 to a driving pulley 89. Driving pulley 89 is secured on a shaft 91 and another pulley 93 is secured on the shaft 91 above the pulley 89. Pulley 93 is, in turn, drivingly connected to driving pulley 95 (FIG. 3) through pulley belt 97. Pulleys 93 and 95 are on opposite sides of the main vertical member 33, and, therefore, an opening 98 is provided in the member 33, through which the pulley belt 97 passes. Driving pulley 95 is secured on the drive shaft 99 (FIG. 3) of electric motor 101. The motor is fastened to the main vertical member 33 by screws 103 (FIG. 2). The motor 101 is connected to the electrical switch box 55 through lead 103 thereby connecting the motor to the source of electrical energy (not shown).

The motor 101 is a high speed electric motor and therefore the impeller 75 in the main reaction chamber 41 is rotated rapidly thereby vigorously mixing the acid and solid material to be analyzed and keeping solids suspended in the liquid. The agitating means provides a sufficient degree of agitation to maintain substantially all of the solids in the main reaction chamber 41 in suspension so that any remaining solids may overflow out of the reaction chamber thereby preventing any substantial build-up of solids in the reaction chamber 41. The resultant phosphoric acid solution containing suspended solids in the main reaction chamber 41 overflows out of the chamber through an overflow conduit 105 which is connected to an upper portion of the chamber. The overflowing solution is mainly liquid; however, due to the agitation occurring in the main chamber 41, solids are suspended or entrained in the liquid. The material overflowing through conduit 105 empties into a standpipe 107 which is attached to the side of the reaction or separation vessel 29 which provides the secondary reaction or separation zone. The reaction or separation vessel 29 is supported on a horizontal support 108 which extends outwardly from member 33. The material in the standpipe 107 flows downwardly and passes out of an opening 109 (FIG. 5) in the lower portion thereof and into a secondary reaction or separation chamber 111. An agitation means is also provided in this secondary reaction chamber. The agitation means includes an impeller 113 which is secured to the lower end of a drive shaft 115. The upper end of the drive shaft 115 is connected to a coupling 117. The drive shaft 91 extends upwardly from the coupling 117 and passes through the alignment bearing 119 which is secured in the support 85. The pulleys 89 and 93 are secured on the shaft 91 and are drivingly connected to the motor 101 as hereinbefore described. The secondary reaction or separation chamber 111 is provided to insure substantially complete reaction of the acid with the acid reactable phosphorus values in the suspended entrained solids which pass out of the primary reaction chamber 41 through the overflow conduit 105 and to separate the phosphoric acid values.

The resultant solution in the secondary reaction or separation chamber 111 is divided into two streams. Some of the solution overflows out of the chamber 111 through an overflow pipe or conduit 119. The overflow pipe 119 conducts the liquid to a larger pipe 121 which conducts the material to a sewer or other suitable disposal point. Some of the solution, however, is withdrawn from the secondary reaction chamber 111, downwardly through a short conduit 123 which extends downwardly from the chamber 111. A screen 125 is provided at the entrance into this conduit for removing any solids which may still be present in the solution. The impeller 113 maintains agitating conditions in the secondary reaction chamber 111 which keeps the solids in the chamber in suspension in the liquid so that the solids overflow with the solution through overflow conduit 119. The agitator also functions to prevent the filter or screen 125 from clogging by agitatingly removing solids from the screen 125. In this manner, any solids build-up in the secondary reaction zone 41 is substantially prevented. A smaller diameter conduit 127 connects with the short conduit 123 above the lower end of the conduit 123 thereby also providing a trap wherein any solids which may pass through the screen 125 may collect. Since the level of the liquid in the chamber 111 is constant at the level of the overflow pipe 119, a constant pressure head is on the lower end of the chamber 111 and a substantially solids-free phosphoric acid stream flowing at a substantially constant predetermined rate may be withdrawn out of the chamber 111. In the commercial embodiment of this invention, the 45 ml. per minute of solution flowing into the chamber 111 was substantially split with 20 ml. per minute of solution containing entrained solids passing out through the overflow conduit 119 and 25 ml. per minute of a substantially solids-free phosphoric acid solution being withdrawn through conduits 123 and 127.

The liquid stream in conduit 127 flows therethrough by gravity flow due to the differences in liquid levels and empties into the dilution stage 15. The level of the overflow 119 is above the outlet of the conduit 127 into the dilution stage 15, and, therefore, due to the resultant pressure head, the stream will flow by gravity into the dilution stage vessel 15. The liquid stream emptying into the dilution stage 15 will contain the phosphoric acid which resulted from the reaction of the hydrochloric acid with the acid reactable phosphate materials in the sample of material to be analyzed.

As hereinbefore set forth, the phosphoric acid emptying into the dilution stage vessel 15 is usually too concentrated for accurate colorimetric determination. Therefore, it is preferred to dilute the phosphoric acid before colorimetric analysis thereof. It is necessary, however, that the amount of dilution be known and therefore the amount of water entering the dilution stage vessel 15 must be a substantially constant predetermined stream. Water at a substantially constant rate is introduced into the dilution stage vessel 15 through a pair of conduits 129 which are connected to the water head tank 17.

The water is supplied to the water head tank 17 from a large source (not illustrated), such as a water tap, through inlet conduit 131.

The water head tank 17, like the acid head tank 13, is of a constant-head type and is supported on a platform 133 which is secured to the main vertical supporting member 33. An overflow standpipe 135 extends through the bottom of the water head tank 17 and terminates in an upper portion of the tank. A conduit 137 connects with the lower end of the standpipe 135 and conducts water overflowing into the standpipe to the overflow conduit 119. The water head tank 17 has a pair of standpipes 139 therein and the upper ends of these standpipes terminate below the upper end of the overflow standpipe 135. The lower ends of these standpipes 139 are connected to the pair of conduits 129 which deliver water to the dilution vessel 15. The amount of water entering through conduit 131 is greater than that withdrawn through standpipes 139, and, therefore, the level of the acid in the tank 17 will be at the upper level of the overflow standpipe 135. There will, therefore, be a constant head or pressure on the upper end of the standpipes 139 and the flow therethrough will be constant. In the commercial embodiment of this invention, water was delivered into the water head tank through conduit 131 at the rate of 2120 ml. per minute, 1060 ml. per minute of water overflowed through standpipe 135 and 1060 ml. per minute passed into dilution stage vessel 15.

As illustrated in FIGURE 1, the dilution vessel 15 is a cylindrical tank which rests on a horizontal support 141 which extends outwardly from the main vertical member 33. The vessel 15 is below the reaction vessels and below the water head tank 17. An inclined glass plate 143 is provided adjacent a center portion of the vessel 15. The substantially solids-free phosphoric acid entering vessel 15 through conduit 127 and the water entering through conduits 129 are mixed by splashing on the inclined glass plate. The diluted acid runs down the glass plate 143 and flows into the lower section of the vessel 15 through an opening 145 in the plate at a lower portion end thereof. The lower section of the dilution vessel 15 is designed somewhat similar to the acid head tank 13 and the water head tank 17, that is, it has an overflow standpipe 147 which extends upwardly and ends near the center of the vessel 15 and another short standpipe 149 which extends only slightly above the bottom of the vessel 15. In this manner some of the liquid entering the dilution vessel overflows into standpipe 147 and goes out to waste disposal through conduit 151 while the remainder of the liquid is withdrawn through standpipe 149. Since the difference in elevation between the upper end of the standpipes 147 and 149 is constant, a substantially constant pressure head is on standpipe 149 and a substantially constant rate may be withdrawn by gravity flow through the standpipe which is passed through conduit 153 into the reagent mixing stage vessel 19. In the commercial embodiment of the invention, 25 ml. per minute of phosphoric acid entered the dilution vessel 15 and was diluted with 1060 ml. per minute of water; 867 ml. per minute of the diluted acid was withdrawn through conduit 151 and passed to waste while 218 ml. per minute was withdrawn through conduit 153 and passed into the reagent mixing vessel 19.

In the reagent mixing vessel 19, the diluted phosphoric acid is mixed with the reagent which reacts with the phosphoric acid to produce a colored solution. The reagent is supplied from a large source (not shown). The reagent is withdrawn from the source (not shown) through conduit 155 (FIG. 2) and passes into the suction end of a micropump 157. This micropump is similar to micropump 49 which is used for pumping the acid. The micropump 157 is driven by an electric motor 159 which is connected through lead 161 (FIG. 2) to the switch box 55 which is connected to a source of electrical energy (not shown). A spare pump 163 and motor 165, which is connected to the switch box 55 through lead 167, are also provided. This spare may be used to pump either the acid or the reagent.

The reagent is discharged from pump 157 through a conduit 169 which is connected to a lower portion of the reagent head tank 21. The reagent head tank, like vessels 13, 15, and 17, is of the constant-head type and is supported on a platform 171 which is secured to the main vertical supporting member 33. To prevent splashing of the reagent out of the tank 21, a cover 173 is provided. This tank 21 is above the reagent mixing vessel 19 to permit gravity flow from tank 21 into vessel 19.

An overflow standpipe 175 extends through the bottom of the reagent head tank 21 and terminates in an upper portion of the tank. A return conduit 177 connects with the lower end of the standpipe 175 and conducts reagent overflowing into the standpipe 175 back to the source of supply (not shown) for reuse. The reagent head tank 21 also has a second standpipe 179 therein and the upper end of this standpipe 179 terminates below the upper end of the overflow standpipe 175. The amount of reagent entering through conduit 169 is greater than that withdrawn through standpipe 179 and, therefore, the level of the reagent in the tank 21 will be at the upper level of the overflow standpipe 175 and there will, therefore, be a constant head or pressure on the upper end of standpipe 179 and the rate of reagent flow therethrough will be substantially constant. The lower end of the standpipe 179 is connected to a conduit 181 which connects with a trap 183. Any solid heavy material in the reagent will settle to the bottom of the trap 183. An upwardly inclined conduit 185 extends from the trap and then turns downwardly sharply as indicated at 187 to direct liquid downwardly into the reagent mixing vessel 19. The level of reagent in the reagent head tank 21 is higher than the outlet from conduit 185 and, therefore, the reagent flows by gravity out of the trap 183 through conduit 185 at a constant flow rate into the reagent mixing tank 19. The conduit is clamped in place by a clamp 189 which is attached to the vertical member 33. In the commercial embodiment of the apparatus, the micropump 157 pumped approximately 450 ml. per minute into the reagent head tank 21; 428 ml. per minute were returned through conduit 177 and 22 ml. per minute passed through conduits 181 and 185 into the reagent mixing vessel 19.

In the commercial embodiment of this invention, the reagent was prepared by dissolving 640 grams of ammonium molybdate in 8 liters of water. A second solution was prepared by dissolving 32 grams of ammonium vanadate in 3.6 liters of water to which 4.4 liter sof commercial grade muriatic acid was added. The two solutions were then combined to provide the reagent.

The reagent mixing vessel 19, like vessel 15, has an inclined glass deck 191 therein upon which the dilute acid and reagent splash, thereby mixing the two. The reaction of the phosphoric acid with the reagent produces a yellow colored solution. The colored solution runs down the inclined deck 191 and flows into a lower portion of the mixing vessel 19 through an opening 193 in the deck. The colored solution continues to flow by gravity out of the mixing vessel 19 through a pair of parallel tubes or conduits 195 connected to the bottom of the vessel 19. The pair of tubes enters a short cylindrical member 197 and a single tube or conduit 199 exits from this member. The conduit 199 leads into a cell 201 of the photoelectric colorimeter 23. In the colorimeter, the light transmitted through the colored solution is measured by its effect on a photoelectric cell. In the commercial embodiment of this invention, a Beckman Model 7700 Flow Colorimeter was used. The specific workings of the colorimeter are well known to those skilled in the art and a further description of the colorimeter is not believed necessary for a complete understanding of this invention. The colored solution exits the colorimeter through a conduit 203. The colorimeter is connected by leads 204 to a recorder 25 which records the signal of the colorimeter. The recorder 25 may, in turn, be connected to another recorder 26 which converts the signal from recorder 25 into percent phosphorus, BPL or $P_2O_5$ readings. The recorders 25 and 26 are connected to a suitable source of electrical energy (not shown) through leads 205 and 207 (FIGURE 6) respectively. Recorders such as 25 and 26 are well known in the art and except for their novel use herein, their actual construction forms no part of this invention and it is not believed that a further description of their workings is necessary. In the commercial embodiment of this invention, the second recorder, 26, was calibrated to indicate BPL over a 2% to 15% range, and, for the material analyzed, it indicated 5% to 6% BPL, which checked with the analysis for BPL made according to standard laboratory procedures. Approximately 10 minutes were required from the time the sample was introduced into the analyzer until the BPL content of the sample was indicated.

The first recorder 25 or the second recorder 26 may be of the recorder-controller type in which an output signal is produced. The output signal may be connected to a suitable type of automatic controlling device so as to automatically control one or more of the process variables. For example, the output signal of the recorder-controller can automatically control the position of a valve so as to control flow rate through a process line, or it can be connected to a valve so as to control pressure, or to a rheostat so as to change speed of a pump or power output of a heater, etc. Various other means of adapting the method of this invention to automatic control of a plant will be apparent to those skilled in the art.

Figure 7:
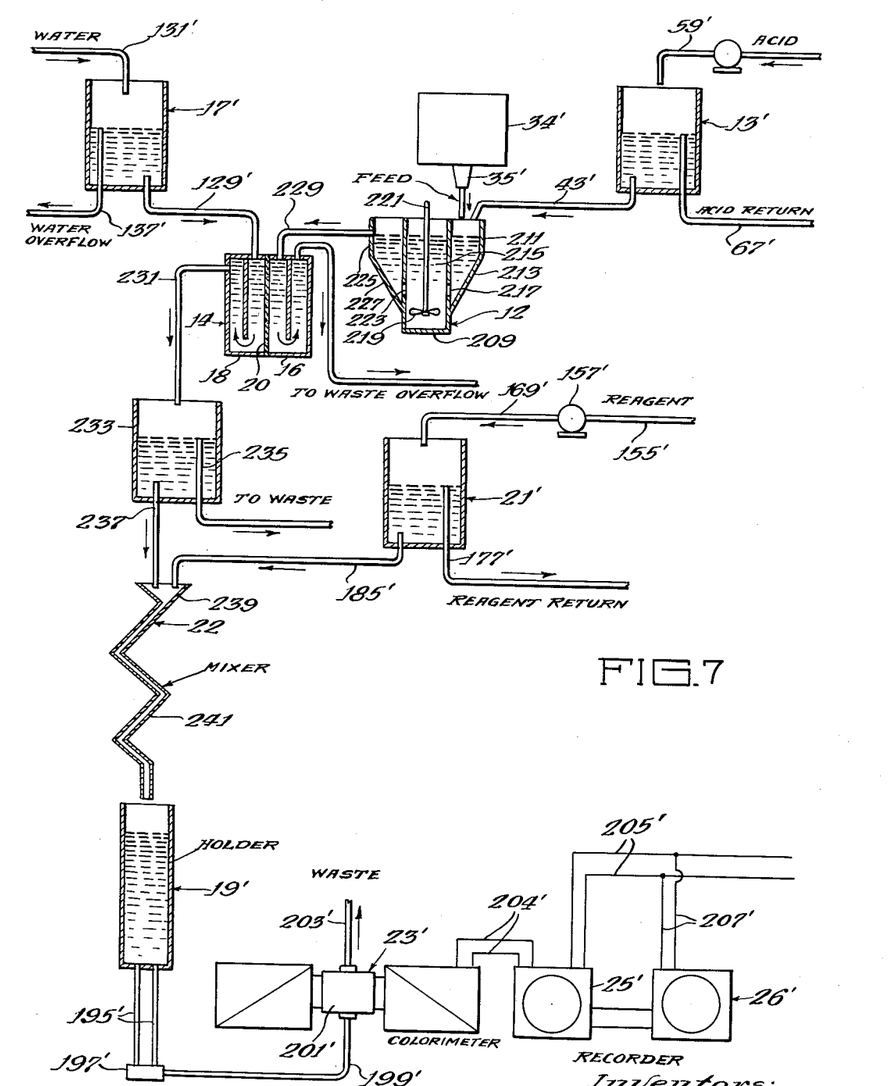
FIGURE 7 is a schematic representation of another form of apparatus which may be used to perform the method of this invention.

Another embodiment of the method of the present invention is illustrated in FIGURE 7. Referring now to FIGURE 7, many of the items of apparatus which are schematically illustrated in this figure are substantially identical to items of apparatus shown in FIGURES 1 to 5 or schematically illustrated in FIGURE 6. In order to facilitate the understanding of the embodiment illustrated in FIGURE 7 without an undue amount of repetition of description when the items of apparatus and the function of the items of apparatus illustrated in FIGURE 7 are substantially identical to the items of apparatus and the function of these items of apparatus illustrated in FIGURES 1 to 6, prime numbers (') will be used to designate these items in FIGURE 7 and the description will be limited to that believed necessary to fully describe the embodiment illustrated in FIGURE 7. This is done with the understanding that if a fuller description of any specific feature illustrated in FIGURE 7 is desired the description of the corresponding feature illustrated in FIGURES 1 to 6 may be referred to.

Referring now more particularly to FIGURE 7, a predetermined amount of the phosphatic material to be analyzed is delivered through a box-like conduit 34' into a funnel 35' which collects the material and directs it downwardly into the reaction zone 12. The reaction zone 12 includes a reaction cell 209. The material to be analyzed is delivered to a standpipe 211 of the reaction cell 209. The standpipe 211 has an inclined bottom plate 213 which is inclined downwardly toward the main reaction chamber 215 of the reaction cell 209. Adjacent the lower portion of the bottom plate an opening 217 is provided through which material in the standpipe 211 may flow into the cylindrical main reaction chamber 215.

In the main reaction chamber 215 the phosphatic material reacts with an acid that is introduced into the reaction cell 209 through conduit 43'. The acid is introduced into the reaction cell 209 at a substantially constant predetermined rate from a constant-head type tank 13'. The acid is introduced into tank 13' through conduit 59' and the overflow is withdrawn through conduit 67'.

The acid and solid phosphatic material containing acid reactable phosphorus compounds react in the reaction zone 12. In order to speed the reaction and to maintain the solids in suspension in the liquid, an agitation means including an impeller 219 which is secured to a lower end of a shaft 221 is provided. The impeller 219 is rotated rapidly thereby vigorously mixing the acid and solid material and keeping the solids suspended in the liquid. The main reaction chamber 215 is in fluid communication through opening 223 with a settling chamber provided by a standpipe 225. The standpipe 225 has an inclined bottom 227 which is inclined downwardly toward the main reaction chamber 215 of the reaction cell 209. The opening 223 is adjacent the lower portion of the bottom plate 228.

The rotating impeller 219 provides a sufficient degree of agitation in the main reaction chamber 215 and in the standpipe 122' to maintain substantially all of the solids in the main chamber 215 in suspension. The degree of agitation carried over into the standpipe 225 is sufficient to maintain in suspension the smaller solid particles while larger particles drop out of solution in the standpipe 225 and the inclined bottom plate 227 directs these large size particles back into the main chamber 215. The agitation, however, is of a sufficient degree to prevent any substantial build up of solids in the reaction chamber 215.

The upper portion of the standpipe is provided with an overflow conduit 229 through which phosphoric acid solution, containing any suspended solids, is overflowed and directed by gravity flow downward and into compartment 16 of the dialysis cell 14. This cell and its operation are hereinbefore described. The water introduced into compartment 18 of the dialysis cell is provided at a substantially constant predetermined rate from a constant head type tank 17' via conduit 129'. Water is supplied to tank 17' via conduit 131' and overflowing water passes out of tank 17' via conduit 137'.

The dilute solids-free phosphoric acid solution is withdrawn from compartment 18 of dialysis cell 14 through conduit 231 and is introduced into a constant head tank 233 which divides the flow of liquid introduced into the tank 233. Some of the solution overflows from tank 233 through overflow conduit 235 and some is withdrawn by gravity flow from tank 233 through conduit 237 at a substantially constant predetermined flow rate and is introduced into a funnel 239 of a mixer 22.

In the mixer 22, the diluted phosphoric acid is mixed with the reagent which reacts with the phosphoric acid to produce a colored solution by cascading downwardly in a tortuous path 241 in the mixer 22. The reagent is supplied from a large source (not shown). The reagent is withdrawn from the source (not shown) through conduit 155' and passes into the suction end of a micropump 157'. The reagent is discharged from pump 157' through a conduit 169' which is connected to a lower portion of a reagent head tank 21'. The reagent head tank 21' is of the constant-head type and is positioned above the reagent mixer 22 to permit gravity flow at a substantially constant predetermined rate into mixer 22. An overflow conduit or standpipe 177' extends through the bottom of the reagent head tank 21' and terminates in an upper portion of the tank. Reagent overflowing the standpipe 177' is returned back to the source of supply (not shown) for reuse. The reagent is supplied at a substantially constant predetermined rate by gravity flow from the head tank 21' to the mixer 22 via conduit 185'.

The mixture of phosphoric acid and reagent exiting from the lower portion of mixer 22 is directed to a reagent mixing vessel or holding vessel 19'. From this point, that is from the reagent mixing vessel 19', the process and apparatus used are substantially identical with the process and apparatus illustrated in FIGURES 1 to 6.

The reaction of the phosphoric acid with the reagent produces a yellow colored solution. The colored solution continues to flow by gravity out of the mixing vessel 19' through a pair of parallel tubes or conduits 195' connected to the bottom of the vessel 19'. The pair of tubes enters a short cylindrical member 197' and a single tube or conduit 199' exits from this member. The conduit 199' leads into a cell 201' of a photoelectric colorimeter 23'. The colored solution exists the colorimeter through a conduit 203'. The colorimeter is connected by leads 204' to a recorder 25' which records the signal received from the colorimeter. The recorder 25' may, in turn, be connected to another recorder 26' which converts the signal from recorder 25' into percent phosphorus, BPL, $P_2O_5$, or other desirable readings. The recorders 25' and 26' connect to a suitable source of electricity (not shown) through leads 205' and 207' respectively.

The description of the invention utilized specific reference to certain process details; however, it is to be understood that such details are illustrative only and not by way of limitation. Other modifications and equivalents of the invention will be apparent to those skilled in the art from the foregoing description.

This application is a continuation-in-part of our copending application Serial No. 716,114, filed February 19, 1958, now abandoned.

We claim:

1. A method for determining the acid reactable phosphorus content of solid phosphatic material which comprises placing a predetermined weight of said phosphatic material into a reaction zone, continuously passing into said reaction zone at a substantially constant predetermined rate a strong mineral acid having a substantially constant predetermined concentration and capable of converting substantially all of the acid reactable phosphorus values in said phosphatic material into phosphoric acid, maintaining agitating conditions in said reaction zone, continuously overflowing the solution from said reaction zone into a separation zone in which the phosphoric acid values are separated, withdrawing at a substantially constant predetermined rate a substantially solids-free phosphoric acid-containing solution from said separation zone and introducing at least a portion of the withdrawn phosphoric acid-containing solution at a substantially constant predetermined rate into a mixing zone, introducing into said mixing zone at a substantially constant predetermined rate a reagent capable of reacting with the phosphoric acid to produce a colored solution, measuring the intensity of the color of said solution and comparing the measured color intensity to a standard to determine the phosphorus content of said solid phosphatic material.

2. A method for determining the acid reactable phosphorus content of solid phosphatic material containing an acid insoluble solid which comprises placing a predetermined weight of said phosphatic material into a reaction zone, continuously passing into said reaction zone at a substantially constant predetermined rate a strong mineral acid having a substantially constant predetermined concentration and capable of converting substantially all of the acid reactable phosphorus values in said phosphatic material into phosphoric acid, maintaining agitating conditions in said reaction zone sufficent to suspend the acid insoluble solid material in the liquid, continuously overflowing solution and entrained solid material from said reaction zone into a separation zone to produce a phosphoric acid solution substantially free of solids and a solids-containing phosphoric acid solution, withdrawing said substantially solids-free phosphoric acid-containing solution at a substantially constant predetermined rate from said separation zone and introducing at least a portion of the withdrawn phosphoric acid-containing solution at a substantially constant predetermined rate into a mixing zone, introducing into said mixing zone at a substantially constant predetermined rate a reagent capable of reacting with the phosphoric acid to produce a colored solution, measuring the intensity of color of said solution and comparing the measured color intensity to a standard to determine the phosphorus content of said solid phosphatic material.

3. The method as recited in claim 2 wherein the acid comprises hydrochloric acid.

4. The method as recited in claim 2 wherein the solid phosphatic material comprises phosphate rock.

5. The method as recited in claim 2 wherein the solid phosphatic material comprises triple superphosphate.

6. The method as recited in claim 2 wherein the solid phosphatic material comprises dicalcium phosphate.

7. A method for determining the acid reactable phosphorus content of solid phosphatic material containing acid insoluble material which comprises placing a predetermined weight of said phosphatic material in finely divided form into a reaction zone, continuously passing into said reaction zone at a substantially constant predetermined rate a strong mineral acid having a substantially constant predetermined concentration and capable of converting substantially all of the acid reactable phosphorus values in said phosphatic material into phosphoric acid, maintaining agitating conditions in said reaction zone sufficient to maintain the solids in the reaction zone in suspension in the liquid in said reaction zone, continuously overflowing solution and entrained solid material from said reaction zone into a separation zone, maintaining agitating conditions in said separation zone sufficient to maintain the solids in said separation zone in suspension in the liquid in said separation zone, continuously overflowing solution and entrained solid material from said separation zone, withdrawing at a substantially constant predetermined rate a solids-free phosphoric acid solution from said separation zone and introducing at least a portion of the withdrawn phosphoric acid solution at a substantially constant predetermined rate into a mixing zone, introducing into said mixing zone at a substantially constant predetermined rate a reagent capable of reacting with the phosphoric acid to produce a colored solution, measuring the intensity of the colored solution and comparing the measured color intensity to a standard to determine the phosphorus content of said solid phosphatic material.

8. A method as recited in claim 7 wherein said acid insoluble material comprises silica and wherein the acid comprises hydrochloric acid.

9. A method for determining the acid reactable phosphorus content of solid phosphatic material containing acid insoluble material which comprises placing a predetermined weight of said phosphatic material into a reaction zone, continuously passing into said reaction zone at a substantially constant predetermined rate a strong mineral acid having a substantially constant predetermined concentration and capable of converting substantially all of the acid reactable phosphorus values in said phosphatic material into phosphoric acid, maintaining agitating conditions in said reaction zone sufficient to suspend the acid insoluble solids in the reaction zone in suspension in the liquid in said reaction zone, continuously overflowing solution and entrained solid material from said reaction zone into one compartment of a dialysis zone, said dialysis zone being separated into two compartments by a semi-permeable membrane, withdrawing at a substantially constant predetermined rate from the second compartment a substantially solids-free phosphoric acid-containing solution and introducing at least a portion of the withdrawn solution at a substantially constant predetermined rate into a mixing zone, introducing into said mixing zone at a substantially constant predetermined rate a reagent capable of reacting with the phosphoric acid to produce a colored solution, measuring the intensity of the color of said solution and comparing the measured color intensity to a standard to determine the phosphorus content of said solid phosphatic material.

10. A method as recited in claim 9 wherein said acid insoluble material comprises silica and wherein the acid comprises hydrochloric acid.

11. A method as recited in claim 9 wherein said phosphatic material comprises dicalcium phosphate and wherein the acid comprises hydrochloric acid.

12. A method for determining the acid reactable phosphate content of solid phosphatic material comprising the steps of introducing at time intervals predetermined weight increments of said solid phosphatic material in finely divided form into a first reaction zone, continuously passing into said first reaction zone at a substantially constant predetermined rate a strong mineral acid having a substantially constant predetermined concentration and capable of converting substantially all of the acid reactable phosphorus values in said phosphatic material into phosphoric acid, maintaining agitating conditions in said first reaction zone, continuously overflowing solution and entrained solid material from said first reaction zone into a second reaction zone, continuously overflowing solution and entrained solid material from said second reaction zone, withdrawing at a substantially constant predetermined rate a substantially solids-free phosphoric acid-containing solution from said second reaction zone and introducing at least a portion of the withdrawn phosphoric acid-containing solution at a substantially constant predetermined rate into a mixing zone, introducing into said mixing zone at a substantially constant predetermined rate a reagent capable of reacting with the phosphoric acid to produce a colored solution, measuring the intensity of the colored solution and comparing the measured color intensity to a standard to determine the phosphorus content of said solid phosphatic material.

13. A method for determining the acid reactable phosphate content of solid phosphatic material comprising the steps of introducing at time intervals predetermined weight increments of said solid phosphatic material in finely divided form into a first reaction zone, continuously passing into said first reaction zone at a substantially constant predetermined rate a strong mineral acid having a substantially constant predetermined concentration and capable of converting substantially all of the acid reactable phosphorus values in said phosphatic material into phosphoric acid, maintaining agitating conditions in said first reaction zone, continuously overflowing solution and entrained solid material from said first reaction zone, into a second reaction zone, continuously overflowing solution and entrained solid material from said second reaction zone withdrawing at a substantially constant predetermined rate a substantially solids-free phosphoric acid-containing solution from said second reaction zone and introducing at least a portion of the withdrawn phosphoric acid-containing solution at a substantially constant predetermined rate into a dilution zone, introducing water at a substantially constant predetermined rate into said dilution zone, withdrawing at a substantially constant predetermined rate diluted phosphoric acid-containing solution from said dilution zone and introducing the withdrawn diluted solution into a mixing zone, introducing into said mixing zone at a substantially constant predetermined rate a reagent capable of reacting with the phosphoric acid to produce a colored solution, measuring the intensity of the colored solution and comparing the measured color intensity to a standard to determine the phosphorus content of said solid phosphatic material.

14. The method as recited in claim 12 wherein the acid comprises hydrochloric acid.

15. The method as recited in claim 12 wherein the solid phosphatic material comprises phosphate rock.

16. The method as recited in claim 12 wherein the solid phosphatic material comprises triple superphosphate.

17. The method as recited in claim 12 wherein the acid comprises sulfuric acid.

References Cited in the file of this patent

UNITED STATES PATENTS

| | | |
|---|---|---|
| 2,049,032 | Weber et al. | July 28, 1936 |
| 2,953,440 | Claudy | Sept. 20, 1960 |
| 2,979,385 | Karasek et al. | Apr. 11, 1961 |

OTHER REFERENCES

Lundgren: Analytical Chem., vol. 32, #7, June 1960, pp. 824 to 828.